United States Patent [19]

Reed

[11] 4,246,780

[45] Jan. 27, 1981

[54] FORCE SENSING SYSTEM

[75] Inventor: Jay R. Reed, Harrison Township, Mercer County, N.J.

[73] Assignee: The United States of America as represented by the Secretary of the Navy, Washington, D.C.

[21] Appl. No.: 34,886

[22] Filed: Apr. 30, 1979

[51] Int. Cl.³ ............................................. G01L 5/12
[52] U.S. Cl. ................................................... 73/140
[58] Field of Search ...................... 73/140, 790, 141 A

[56] References Cited

U.S. PATENT DOCUMENTS

| 2,173,493 | 9/1939 | Peters | 73/790 |
| 2,920,880 | 1/1960 | Laycock | 73/141 A |
| 3,064,221 | 11/1962 | King | 73/141 A |
| 3,557,612 | 1/1971 | D'Arcy | 73/141 A |
| 3,559,474 | 2/1971 | Guroz et al. | 73/141 A |
| 3,826,130 | 7/1974 | Pusch | 73/141 A |

Primary Examiner—Anthony V. Ciarlante

Attorney, Agent, or Firm—R. S. Sciascia; Henry Hansen; Stanton D. Weinstein

[57] ABSTRACT

Apparatus for measuring thrust loading on a rotating shaft. A plurality of strain gages, electrically connected in parallel and series to form one arm of a Wheatstone bridge circuit, are mounted at equal intervals on a thin strap or band formed to surround the shaft with a predetermined hoop load. Lubricating material disposed between the shaft and the band prevents transfer of friction forces from the shaft to the band. As the thrust loading increases, shaft dilation (girth increase) causes the band to stretch and increase its stress. This hoop stress is measured by the strain gages mounted on the band, and is transmitted as the output signal produced by the bridge via radio telemetry or slip rings to a remote indicator. A second arm of the Wheatstone bridge circuit, to provide compensation for temperature effects, can be provided by an additional strain gage mounted on a block of material identical to that of the shaft which block is in turn mounted on the above thin strap or band.

15 Claims, 4 Drawing Figures

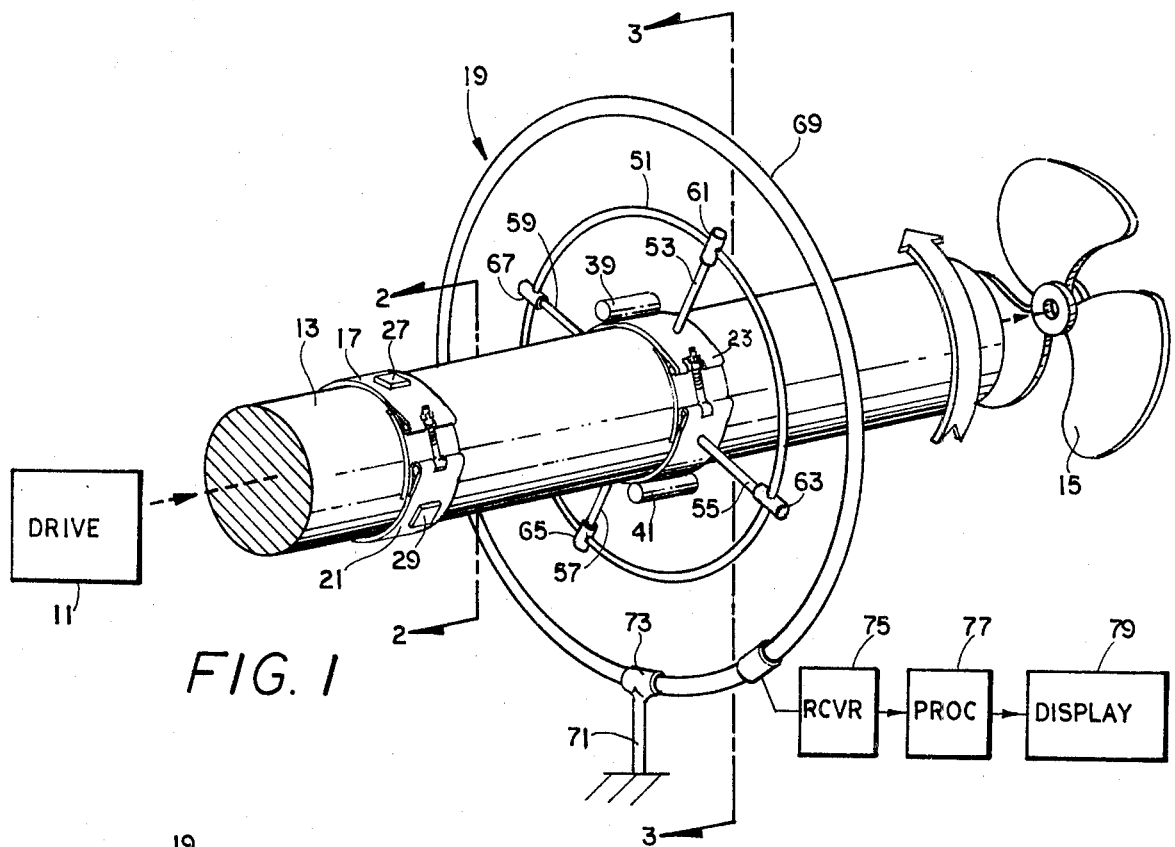
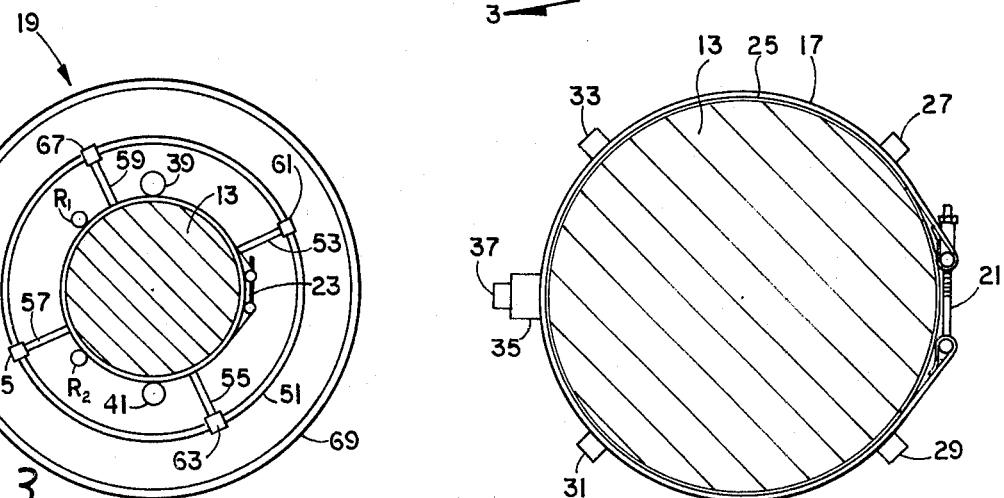
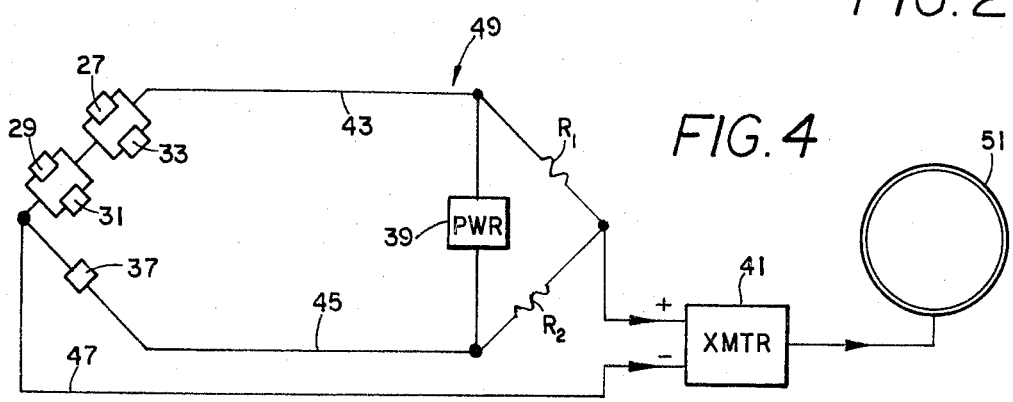

FORCE SENSING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to devices for measuring stress on or strain of a material or structure, and more particularly to devices for measuring thrust such as that applied to shafts or bearings.

There is a need to make thrust measurements on propulsion shafts and machinery shafting such as on naval vessels. Accurate thrust measurements are needed on engine shafting such as ship propulsion shafting, especially on high speed gas turbine powered surface ships to determine propeller capability and the amount of drag on the ship due to hull fouling. Thrust measurements on rotating shafting experiencing torque loads are difficult to make. Conventionally, thrust measurements can be made utilizing one or more load cells placed in line with the shafting at a thrust bearing, which is usually difficult and requires the disassembly of machinery and costly design changes to incorporate the load cells. Alternatively, strain gages can be directly applied to the shafting, and the signals therefrom may be received from the rotating shaft via slip rings or radio telemetry. The shaft thrust is then calculated from these strain readings, knowing shaft material and geometry. However, shaft strains due to thrust, particularly those on ship propulsion shafting, are very low compared to strains due to shaft torque. Accordingly, only slight angular misplacement or misalignment of a strain gage on the shaft can cause substantial measurement errors in the thrust related strain output, due to shaft torque. Thus, such strain gages so mounted must be precisely oriented, and must be applied to the shaft by one who is expert with the application of strain gages. Temperature variations and centrifugal loading effects can also introduce errors in such thrust measurement.

SUMMARY OF THE INVENTION

Accordingly, it is a general purpose of the present invention to provide a device capable of sensing force applied to a member.

Other objects of the present invention are to provide a shaft thrust transducer capable of sensing and enabling measurement of thrust and other axial forces applied to rotating shafting such as ship propulsion shafting and machininery shafting, which is easy to apply to a shaft or other equipment, and which does not require precise orientation on installation for accurate performances.

Further objects of the present invention are to provide a force sensing system capable of making accurate thrust measurements on propulsion, machinery or other shafting, and minimizing measurement errors due to shaft torque, temperature change, hysteresis effects, bending and centrifugal loading effects.

Briefly, these and other objects of the present invention are accomplished by a force transducer including a flexible preloaded band disposed about a complete perimeter or circumference of a member such as a rotatable shaft, lubricating material disposed between the band and the shaft, and a plurality of strain gages mounted on the band for measuring stress imposed on the band resulting from dilations or variations in cross-sectional area of the member caused by applied thrust, axially oriented force, or pressure loading on the member. An additional strain gage can be mounted on a block of material identical to that of the shaft and which is mounted on the band, to provide compensation for variations in strain gage stress readings resulting from temperature variations of the shaft. A transmitting device disposed on the member receives and provides the measurements or indications provided by the strain gages to a remote indicator which need not be on the member.

Other objects, advantages and novel features of the invention will become apparent from the following detailed description of the invention when considered in conjunction with the accompanying drawings wherein:

BRIEF DESCRIPTION OF THE DRAWINGS

FIG. 1 shows a preferred embodiment of a force sensing system according to the present invention installed on a rotating shaft connecting a drive and a load;

FIG. 2 is a section of the shaft taken on the line 2—2 of FIG. 1 and showing a side view of a portion of the system of FIG. 1;

FIG. 3 is a section of the shaft taken on the line 3—3 of FIG. 1 and showing a side view of another portion of the system of FIG. 1; and FIG. 4 is a schematic diagram showing a preferred embodiment of the electrical interconnections for the system of FIG. 1.

DESCRIPTION OF THE PREFERRED EMBODIMENT

Referring now to the drawings, wherein like reference characters designate like or corresponding parts throughout the several views, there is shown in FIG. 1 a drive or motor 11, which can for example be an engine such as a high speed gas turbine engine for powering a ship propeller, rotating a shaft 13 such as ship propulsion shafting or machinery shafting to drive a load 15 such as a ship propeller. Drive 11 could alternatively also for example be a steam turbine or an electric motor, and can include a gear reduction system for transmission of power to shaft 13. Shaft 13 can be of any suitable material (such as steel), length and diameter desired. Motor 11 or load 15 or both can impose axial thrust or other force loading on shaft 13. For example, a portion of the thrust provided by propeller 15 to propel a ship also appears on shaft 13 directed from load 15 towards drive 11. As shaft 13 experiences such force loading, for example in a direction parallel to its axis of rotation, its diameter and cross-sectional area increase or decrease with respectively greater or lesser such force loading due to Poisson's effect. A similar result follows from internal pressure when a pipe containing fluid under pressure is substituted for loaded shaft 13. For measuring such loads, shaft 13 is provided with transducer assembly 17 and transmitter assembly 19. As shown in FIG. 2, transducer assembly 17 is disposed about and encompasses one complete circumference of shaft 13. Transducer assembly 17 and transmitter assembly 19 each include a respective adjustable band clamp 21 or 23 having appropriate components mounted thereon. Four strain gages 27, 29, 31 and 33 are mounted on band clamp 21 at 90° intervals. Alternatively, any number of strain gages can be mounted on band clamp 21 at regular intervals. Each of these strain gages should be mounted on clamp 21 oriented in the circumferential, or tangential, (as opposed to axial) direction. To prevent temperature variations among the several strain gages 27, 29, 31, 33 and 37, transducer assembly 17 can be covered with a canvas insulating covering held in place with glass tape. Strain gages 27, 29, 31, 33 and 37 can for example each be a Micro-Measurements Type WK-06-250BB-350 strain gage manufactured by Micro-Measurements division of Vishay Intertechnology, Inc., Romulus, Mich. Disposed between band 21 and shaft 13 is a lubricating material 25 which is preferably a solid lubricant such as a synthetic resin polymer material such as Teflon ®, or nylon, or graphite powder, and can be in the form of a band or strip thereof, for example, 0.076 mm. (0.003 inches) thick. Lubricant 25 provides low friction surfaces between adjustable band clamp 21 and shaft 13. Lubricant 25 provides slip between adjustable band clamp 21 and shaft 13 or other thrust member to significantly reduce errors due to torsional strains. Each clamp 21 or 23 is preferably in the form of a band of thin metal or other flexible material capable of following and responding to shaft 13 dilation and of applying a preload to shaft 13. A thin band is preferred to sense shaft 13 dilation. Each clamp 21 or 23 can for example include a saddle portion where the ends of the clamp are joined and including a T-bolt attached to one end passed through a T-section attached to the other end to a nut for adjusting the tension of the clamp, and having an overlap spotwelded to the clamp disposed underneath the saddle portion; positioning guides or side guides can be provided at the saddle portion if desired. Adjustable band clamp 21 can for example be a stainless steel T-bolt band clamp part number 406-75-1200 manufactured by Specialty Productions Corporation, Wickliffe, Ohio for a shaft 13 having a diameter of 1 foot. An alternative clamp by the above manufacturer is T-bolt band clamp part number 13313-250-860. For clamp part number 406-75-1200, the preferred clamp 21 preload setting, for good sensitivity to thrust with minimum error possibility due to shaft torque, is a clamp nut pretorque of 2.1 newton-meters (20 inch-pounds), which results in a preload of 650 pounds on the strap of the clamp. Such preload should be increased if a heavier band clamp is utilized. Clamp 21 preload should be sufficient to allow the clamp follow shaft 13 dilation due to thrust loading while being low enough to minimize any friction forces transferred to the clamp due to shaft 13 torque. Mounted on clamp 23 are a power supply 39 such as a battery, and telemetry transmitter 41, preferably disposed at diametrically opposite positions on clamp 23 for good weight distribution. Power supply 39 and transmitter 41 can each for example be contained in a cylindrical casing mounted on clamp 23 in a direction parallel to the axis of shaft 13 such as by a clamp or strap. Bridge completion resistors $R_1$ and $R_2$ are also mounted on adjustable band clamp 23. The outputs of strain gages can be affected by temperature. Temperature variations of shaft 13 can cause errors such as static drift or d.c. shift in strain gage 27, 29, 31 and 33 readings, by temperature variations directly affecting strain gage readings as by affecting resistivity, and by affecting shaft 13 dimensions by thermal expansion and contraction. To provide electrical compensation for changes in temperature, there is also mounted on band 21 a solid block 35 of the same material as shaft 13 and preferably larger in size than the strain gages used, and mounted thereon is an additional strain gage 37 preferably identical to the other strain gages 27, 29, 31 and 33 also mounted on clamp 21. The output of strain gage 37 varies as the temperature of block 35 varies and thus as shaft 13 temperature varies, and its output is used to offset any variation in the signal derived from strain gages 27, 29, 31 and 33 due to temperature variation affects. Accordingly, strain gage 37 experiences the same temperature and thermal expansion effects as the other strain gages 27, 29, 31 and 33, but not the mechanically induced strains resulting from shaft 13 dilation that are experienced by the other strain gages. The presence of strain gage 37, which is sensitive only to thermal effects, on an arm of bridge 49 which is adjacent to the arm including the other strain gages 27, 29, 31 and 33 results in canceling out of these thermal effects, since like effects on adjacent bridge arms cancel each other out. Block 35 is made from the same material as shaft 13 on which band clamp 21 is mounted to insure that the block and the shaft have the same thermal coefficient of expansion. It is also desirable that shaft 13 and block 35 have the same thermal conductivity, but this is not absolutely necessary since temperature of the block will still become the same as that of the shaft with time, and insulation of assembly 17 would reduce any effect from disparity of the respective thermal conductivities of the shaft and block. Block 35 itself experiences no shaft 13 mechanically induced strain, but because of its material and position is always at the same temperature as shaft 13. To further isolate strain gage 37 from mechanically induced strains experienced by shaft 13 and clamp 21, block 35 can be mounted on clamp 21 by spot-welding a pair of right-angle metal shims to clamp 21 with their right angles (that is, their smaller angles) facing away from each other, and separately spot-welding block 35 to the shims. Transducer assembly 17 and transmitter assembly 19 need only be separated by a relatively short distance such as one or two inches. Three insulated lines or wires 43, 45 and 47 electrically link various components of transducer assembly 17 and transmitter assembly 19 to form therewith a resistive bridge network 49 of FIG. 4 such as a Wheatstone Bridge. Line 43 connects strain gages 27 and 33 to power supply 39 and resistor R1. Line 45 connects temperature compensating strain gage 37 to power supply 39 and resistor R2. Line 47 connects strain gages 29, 31, and 37 to transmitter 41. Strain gages 27, 29, 31 and 33 connected in a series-parallel arrangement comprise one resistive arm of bridge 49. Temperature compensating strain gage 37, resistor R1 and resistor R2 each provides one of the three remaining resistive arms of bridge 49. Power supply 39 powers bridge 49, and the output signal from the bridge is provided to transmitter 41. The signal produced by telemetry transmitter 41 is provided to telemetry transmitting antenna 51. Transmitting antenna 51 is supported by four stand-offs or supports 53, 55, 57 and 59 mounted on clamp 23. Supports 53, 55, 57 and 59 each are provided with a respective insulator 61, 63, 65 and 67 where they contact antenna 51 to insulate antenna 51 from the supports. Supports 53, 55, 57 and 59 can for example be of mild steel or stainless steel. Each insulator 61, 63, 65 and 67 can for example be a ceramic insulator such as a ceramic insulating sleeve. Alternatively, any number of antenna supports and respective insulators, for example seven or eight, can be mounted on clamp 23, preferably at equal intervals, to support antenna 51. The signal produced by bridge 49 is provided by telemetry transmitter 41 to telemetry transmitting antenna 51 for transmission to telemetry receiving antenna 69. Receiving antenna 69 is fixedly mounted to a fixed support mounting bracket 71, which can for example be of mild steel, provided with an insulator 73 for attachment thereby to antenna 69. Alternatively, receiving antenna 69 can be provided with a plurality of mounting brackets. Thus, while transmitting antenna 51 rotates with rotation of rotating shaft 13, receiving antenna 69 receiving the signal therefrom does not so rotate but is relatively fixed for connection to appropriate external equipment. Antennas 51 and 69 can for example be respective concentric loops or rings of metal wire. The telemetry system, including transmitter, receiver and antennas, for providing the bridge 49 output signal to an external device, can for example be the Acurex 1200 System manufactured by Acurex Corporation, Autodata Division, Mountain View, Calif. The bridge 49 signal received by receiving antenna 69 is then provided in turn to telemetry receiver 75, an appropriate signal processor 77 and display 79 connected thereto. To offset the effects of temperature variations among strain gages 27, 29, 31, 33 and 37, transducer assembly 17 installed on shaft 13 can be substantially covered with insulating material such as light lagging material or steam pipe insulation material.

In summary, operation of the foregoing invention is as follows. As shaft 13 dilates with applied thrust and in a plane perpendicular to the direction of the thrust, such dilation applies tension to clamp 21 which is sensed by strain gages 27, 29, 31 and 33 as applied tangential strain. Because of the presence of lubricant 25 and the preload applied to clamp 21, each strain gage 27, 29, 31 and 33 should produce nearly the same output signal. However, to eliminate any discrepancies or effects resulting from individual variations in readings by the strain gages, their respective values are averaged out in a series-parallel connection configuration. Connecting strain gages 27, 29, 31 and 33 in a series-parallel combination in one active arm of a Wheatstone bridge 49 effects output strain averaging which cancels shaft 13 bending effects. For example, strain gages 27 and 33 can be connected in parallel and strain gages 29 and 31 can also be connected in parallel; these two parallel configurations are then connected in series to form one arm of bridge 49 having a nominal effective resistance equal to that of one such strain gage. Since this initial equivalent resistance is preferably the same as that of strain gage 37 providing another arm of bridge 49, any variation in this effective resistance due to temperature variations is offset by a corresponding variation in the signal produced by strain gage 37. The voltage amplitude produced by power supply 39 is held fixed. Resistors R1 and R2 each constitute one of the remaining two arms of bridge 49, and each have a fixed resistance which can each preferably be equivalent to that of one such strain gage, so that the signal produced by bridge 49 to transmitter 41 will vary only with variation in strain applied to and sensed by strain gages 27, 29, 31 and 33 and thus with variation in dilation of shaft 13. The signal produced by bridge 49 indicative of thrust or other force applied to shaft 13 is provided by transmitter 41 via antennas 51 and 69 to receiver 75 and in turn to signal processor 77 and display 79 for any desired utilization. Shaft 13 thrust can then be calculated from the strain readings, knowing shaft 13 material and geometry. This calculation can be made using the equation $$\frac{\pi}{4}(D_o^2 - D_i^2)\frac{E}{N}\epsilon_c = \text{shaft thrust},$$

where $D_o$=outside shaft diameter, $D_i$=inside shaft diameter, E=Young's modulus of elasticity for the shaft, N=Poisson's ratio for the shaft, and $\epsilon_c$=the measured circumferential shaft strain.

Band clamp 21 and transducer assembly 17 responds to shaft 13 thrust or similar loading essentially as a displacement transducer. As shaft 13 dilates from Poisson's Effect due to an applied thrust or similar load, band clamp 21 placed around the shaft must stretch by the same amount, thereby producing a strain reading at the gage 27, 29, 31 and 33 locations indicative of the circumferential shaft strain.

In the event of initial misorientation of transducer assembly 17 when applied to shaft 13, the presence of lubricant 25 enables assembly 17 to shift its position on shaft 13 within a few rotations thereof to properly, self-orient to be disposed on a plane perpendicular to the shaft 13 axis of rotation and thus to the direction of thrust loading, and to remain properly oriented. Preloading clamp 21 prevents wobble of a loose clamp 21 on shaft 13 and thus minimizes centrifugal loading effects. Lubricant 25 minimizes errors due to shaft 13 torque and bending. This error reduction occurs because lubricant 25 greatly lowers the coefficient of friction between transducer assembly 17 and shaft 13, thereby reducing the traction forces on clamp 21 produced by shaft 13 torque and bending. Strains due to shaft bending are directed in opposite directions on opposite sides of shaft 13, so that assembly 17 slips over them. Shaft 13 experiences principal strains due to torque loading in a direction 45° with respect to the axis. Shaft 13 experiences principal strains due to thrust loading in directions both parallel and perpendicular to the axis. The presence of lubricant 25 between clamp 21 and shaft 13 introduces slip and reduces friction therebetween. Therefore, insofar as shaft 13 experiences strains which are not perpendicular to the axis, shaft 13 slips underneath clamp 21, and clamp 21 does not experience such strains, but only those due to thrust or other axial loading. Lubricant 25 also reduces errors in thrust sensing due to hysteresis by reducing friction between shaft 13 and transducer assembly 17. Lubricant 25 also improves sensitivity of transducer assembly 17 to thrust.

By connecting strain gages 27, 29, 31 and 33 together in a series-parallel combination in one active arm of a Wheatstone bridge, proper output strain averaging is achieved which cancels shaft bending effects. Uneven loading can distort shaft 13 cross-section to a slightly elliptical shape. If two strain gages are placed 90° apart on clamp 21 and their outputs are averaged, the unwanted bending strains are cancelled. Averaging the outputs of the strain gages also provides repeatable circumferential strain data from transducer assembly 17. Better repeatability is achieved if four strain gages are placed 90° apart on clamp 21 and their outputs are averaged such as by connecting them in a series-parallel combination.

It should be understood that any straps or bands or clamps other than T-bolt clamps 21 and 23 can be utilized with transducer assembly 17 and transmitter assembly 19 in the present invention. Instead, a preloaded (for example to 25 pounds force) shim or other strap placed on top of a solid lubricant and spot-welded to itself to cover one circumference of shaft 13 can be utilize in lieu of clamp 21. For example, band 21 can be formed by first temporarily attaching lubricant strip 25 to shaft 13 such as with cellophane tape, spot welding directly onto shaft 13 a portion of a T-shaped shim strap largely lying on the lubricant strip, wrapping the strap about shaft 13 and preloading it thereon, spot welding the shim onto itself, and removing excess portions of the strap, particularly those portions of the shim strap directly spot-welded to shaft 13, and the tape or other temporary attachment of lubricant strip 25 to shaft 13. Although clamp 21 is preferred as being easier to apply and enabling easier adjustment of transducer assembly 17 preload, the uniformity and continuousness of the shim band reduces unwanted centrifugal loading effects, and so could be desirable on high speed shafting. Also, any means capable of transmitting the bridge 49 output signal from a rotating shaft 13 to a stationary external receiver can be utilized in lieu of telemetry transmitter 41, telemetry transmitting antenna 51, telemetry receiving antenna 69, and telemetry receiver 75. For example, one or more slip rings or collector rings as necessary could be mounted about shaft 13 and connected to the output of bridge 49, and brushes attached to fixed external supports could ride the slip rings as shaft 13 turns to pick up signals therefrom and provide them to an external receiver. However, the telemetry system illustrated in FIGS. 1 and 3 is preferred as being less noisy than the above slip ring arrangement. Also, any number of strain gages desired can be utilized to measure clamp 21 tension and shaft 13 dilation with applied thrust. However, it is preferred that the initial effective resistance of the thrust measuring strain gage arm of bridge 49 be equal or nearly equal to that of the strain gage or gages utilized for temperature compensation thereof for ease of initially balancing bridge 49 and in utilizing bridge 49 signals to indicate the value of thrust applied to shaft 19. For example, where one strain gage is utilized for temperature compensation which is identical to the strain gages utilized for thrust sensing, the number of strain gages utilized for thrust sensing can then be equal to an integer squared, since the effective resistance of n resistors of equal resistance R connected in parallel is R/n. Other nonsquare numbers of gages could also then be utilized; for example, $R/6+R/3+R/2=R$, for eleven resistors (or strain gages). Furthermore, the present invention can be used to sense and measure other forces than thrust which are capable of causing dilation of a member. If it is not desired to utilize a temperature compensating strain gage, a fixed resistor can be substituted therefor in the bridge. In addition, any dry lubricant which will not be extruded from beneath preloaded clamp 21 during use can be utilized as lubricant 25. If desired, a fixed resistor can replace strain gage 37 as one arm of bridge 49. Nut pretorque values between 20 and 40 inch-pounds torque (650 and 1300 pounds strap preload) avoid substantial variation in strain gage readings of similar stresses with slight variation in pretorque levels, high friction levels with corresponding shaft torque interference, and unnecessary strains on the clamp 21 T-bolt. However, higher and lower pretorque levels can also be used, if appropriate care is taken. As has already been discussed above, two or more strain gages can be used in transducer assembly 17. The present invention can sense any force causing shaft 13 dilation, including thrust, other forces directed in the same direction as thrust, and internal pressure of a pipe. For example, the present invention can sense tension forces reducing shaft 13 external diameter. If separate assemblies 17 and 19 are utilized, the assemblies can be kept closely adjacent to one another, for example one inch (which is preferred) to two inches away, but should not touch. Either separate assembly can be kept closer to the source(s) of the force loading being measured, since Poisson's effect affects the entire shaft 13. Any member subject to Poisson's effect can be substituted for shaft 13.

Some of the many advantages of the invention should now be readily apparent. For example, a novel thrust or force transducer has been provided which is capable of sensing and measuring the variations in girth of a rotatable shaft or other member with increases in the thrust or other loading on the shaft, and an arrangement for enabling utilization by remote external equipment of the information produced thereby. When utilized on the propeller shaft of a ship, the invention can sense drag resulting from hull fouling, the presence of a bent propellor blade, etc., as being indicated by a relatively high thrust level with a relatively low ship speed. Also, since such thrust imposes a load on propulsion gears and clutches, monitoring of shaft thrust levels by the invention can indicate the level of such loading and thereby indicate situations of possible danger before damage can occur. The invention is suitable for concomittantly rotating with a shaft, and can provide usable information therefrom to a remote indicator. No moving parts subject to wear are required. Undesirable effects due to centrifugal loading effects, temperature variation, unequally distributed thrust loading effects and torque are minimized or eliminated in the present invention. The invention can be easily applied to a shaft or other member with no alteration of the shaft or member. The invention is sensitive to shaft thrust with no hysteresis effects and can be accurately used without being calibrated on an actual shaft. However, if possible, better accuracy can be obtained by compressing at known loads a section of shaft with assemblies 17 and 19 between thereon.

Obviously, many modifications and variations of the present invention are possible in light of the above teachings. It is therefore to be understood that, within the scope of the appended claims, the invention may be practiced otherwise than as specifically described.

What is claimed is:

1. Apparatus for measuring the thrust loading on a rotating shaft, comprising:
   stressing means adapted to be disposed around the shaft for rotation therewith in a plane perpendicular to the thrust for applying a predetermined compression load to the shaft;
   lubricating means applied to the inner surface of said stressing means for reducing friction between the shaft and said stressing means while applied thereto;
   sensing means connected to said stressing means for producing an output signal indicative of strain experienced by said stressing means; and
   transmitting means formed to be secured to the shaft for rotation therewith and connected to receive said output signal for transmitting an r.f. signal indicative thereof to a remote receiver.

2. Apparatus as recited in claim 1 wherein said stressing means comprises:
   a flexible member; and
   fastening means secured at the ends of said member for fastening said member around the shaft.

3. Apparatus as recited in claim 1 wherein said stressing means comprises an adjustable band clamp.

4. Apparatus as recited in claim 1 wherein said lubricating means comprises a strip of solid lubricant.

5. Apparatus as recited in claim 3 wherein said solid lubricant comprises a synthetic resin polymer.

6. Apparatus as recited in claim 1 wherein said sensing means comprises a plurality of strain gages.

7. Apparatus as recited in claim 6 wherein said plurality of strain gages are operatively interconnected to produce a signal indicative of the instantaneous average of the strain readings of said plurality of strain gages as the output signal.

8. Apparatus as recited in claim 1, further comprising:
receiving means receiving the transmitted signal and producing a received signal indicative of the thrust loading.

9. Apparatus as recited in claim 1, wherein said transmitting means comprises
a first resistance element of predetermined resistance and operatively connected to said stressing means;
a second resistance element of predetermined resistance and operatively connected to said stressing means;
a third resistance element of predetermined resistance and operatively connected to said first and second resistance elements; and
a power supply operatively connected to said first, second and third resistance elements and to said sensing means to form a resistive bridge network including said sensing means, said resistance elements, said power supply and producing a bridge signal indicative of whether the bridge is balanced.

10. Apparatus as recited in claim 9, further comprising:
transmitting means connected to said stressing means and receiving the bridge signal for producing a transmitted signal indicative of the bridge signal;
receiving means receiving the transmitted signal and producing a received signal indicative of the tranmsitted signal; and
indicating means remote from said stressing means and receiving the received signal for providing an indication of strain experienced by said stressing means.

11. Apparatus as recited in claim 1, further comprising:
compensating means connected to said stressing means and operatively connected to said sensing means for compensating the output signal for the effects of temperature changes.

12. Apparatus as recited in claim 11 wherein said compensating means comprises:
a quantity of material having a thermal coefficient of expansion similar to that of the rigid member and connected to said stressing means; and
an additional strain gage fixedly connected to said quantity of material and operatively connected to said sensing means.

13. Apparatus as recited in claim 11, further comprising:
a first resistance element of predetermined resistance and operatively connected to said sensing means;
a second resistance element of predetermined resistance and operatively connected to said compensating means; and
a power supply operatively connected to said first resistance element and to said second resistance element to form a resistive bridge network including said sensing means, said compensating means, said first resistance element, said second resistance element and said power supply and producing a bridge signal indicative of whether the bridge is balanced.

14. Apparatus as recited in claim 13, further comprising:
transmitting means connected to said stressing means and receiving the bridge signal for producing a transmitted signal indicative of the bridge signal;
receiving means receiving the transmitted signal and producing a received signal indicative of the transmitted signal; and
indicating means remote from said stressing means and receiving the received signal for providing an indication of strain experienced by said stressing means.

15. A method for sensing a force applied to a rigid member, comprising:
applying a lubricating material to a perimeter of the rigid member disposed in a plane perpendicular to the direction of the applied force;
applying a flexible member to the rigid member at the perimeter and atop the lubricating material;
stressing the flexible member to exert a compression force on the rigid member at the perimeter; and
sensing variations in strain experienced by the flexible member.

* * * * *